United States Patent [19]

Kikuchi

[11] 4,444,432
[45] Apr. 24, 1984

[54] SEAT BELT CONNECTING DEVICE

[75] Inventor: Tetsuro Kikuchi, Aichi, Japan

[73] Assignee: Nippon Soken, Inc., Nishio, Japan

[21] Appl. No.: 247,552

[22] Filed: Mar. 25, 1981

[30] Foreign Application Priority Data

Mar. 28, 1980 [JP] Japan .............................. 55-42086[U]
Nov. 13, 1980 [JP] Japan ........................... 55-163110[U]

[51] Int. Cl.³ ........................ B60R 21/10; A62B 35/00
[52] U.S. Cl. .................................... 297/476; 280/808;
297/483; 24/196
[58] Field of Search ............... 297/478, 476, 480, 483;
280/801, 803, 807, 808; 24/136 R, 136 K, 171,
230 BC, 230 AK, 230 AL

[56] References Cited

U.S. PATENT DOCUMENTS

| 2,938,254 | 5/1960 | Gaylord | 24/171 |
|---|---|---|---|
| 2,972,173 | 2/1961 | Weber | 24/171 |
| 3,517,416 | 6/1970 | Frei et al. | 24/230 AK |
| 4,009,510 | 3/1977 | Lindblad | 297/483 |
| 4,184,234 | 1/1980 | Anthony | 24/171 X |
| 4,208,770 | 6/1980 | Takada | 297/476 X |

Primary Examiner—James T. McCall
Attorney, Agent, or Firm—Cushman, Darby & Cushman

[57] ABSTRACT

A seat belt connecting device for connecting an outer belt composed of a lap belt portion and a shoulder belt portion to an inner belt, comprises a frame member, to which the inner belt is fastened, an outer belt supporting member which is rotatably and slidably supported by the frame member, an elastic member which is provided between the frame member and the outer belt supporting member and a locking member which is formed in the frame member for locking the outer belt supporting member. When the outer belt is tensioned due to the load applied by the occupant at an emergency time, the outer belt supporting member slides while being rotated, overcoming a pushing force of the elastic member until the outer belt supporting member is locked by the locking member. Consequently, the outer belt is stopped from being shifted with respect to the seat belt connecting device.

10 Claims, 11 Drawing Figures

SEAT BELT CONNECTING DEVICE

BACKGROUND OF THE INVENTION

The present invention relates to a seat belt connecting device which is used for connecting an outer belt composed of a lap belt portion and a shoulder belt portion to an inner belt, especially to a seat belt connecting device provided with a mechanism by which the outer belt is substantially prevented from being shifted at an emergency time such as upon an impact of a vehicle.

In the seat belt system for a vehicle of such a type that the lap belt portion which protects the lap of an occupant and the shoulder belt portion which protects the upper half of the occupant's body from his shoulder to his chest are formed by one outer belt, the outer belt is connected to the inner belt at a position between the lap belt portion and the shoulder belt portion.

One end of the inner belt is connected to the connecting device and the outer belt is shiftably supported thereby.

The occupant can freely move on his seat since the outer belt is shiftably supported by the seat belt connecting device.

Conventionally, as the seat belt connecting device of this type, a rectangular ring-shaped connector which connects the outer belt to the inner belt while shiftably supporting the outer belt has been used.

The seat belt system using the above described conventional seat belt connecting device has a defect that the outer belt relatively shifts with respect to the seat belt connecting device at an emergency time such as upon an impact of the vehicle, namely, that the lap belt portion shifts to the side of the shoulder of the occupant or the shoulder belt portion shifts to the side of the lap of the occupant.

When the lap belt portion shifts to the side of the shoulder of the occupant, the amount of the movement of the upper half of the occupant is increased and when the shoulder belt portions shifts to the side of the lap of the occupant, so-called submarine phenomenon occurs. In both cases, the occupant is not surely protected by the seat belt.

In particular, in the automatic type seat belt system wherein the inner belt is withdrawn from a retractor, the relative shift of the outer belt with respect to the seat belt connecting device is apt to occur at an emergency time.

Accordingly, one object of the present invention is to provide an improved seat belt connecting device for connecting an outer belt to an inner belt, by which the safety of an occupant is more improved at an emergency time such as upon an impact of a vehicle.

Another object of the present invention is to provide a seat belt connecting device for connecting an outer belt to an inner belt provided with an outer belt supporting member which shiftably supports the outer belt at usual times and stops the outer belt from being shifted at an emergency time.

DESCRIPTION OF THE DRAWINGS

Other objects and advantages of the invention will become apparent from the following description of embodiments with reference to the accompanying drawings wherein.

SUMMARY OF THE INVENTION

According to the present invention, a seat belt connecting device for connecting an outer belt composed of a lap belt portion and a shoulder belt portion to an inner belt, comprises a frame member to which the inner belt is fastened, an outer belt supporting member which supports the outer belt and is rotatably and slidably supported by the frame member, an elastic member which is provided between the frame member and the outer belt supporting member for pushing the outer belt supporting member in the direction opposite to the tensioning direction of the outer belt and a locking member which is formed in the frame member for locking the outer belt supporting member.

When the outer belt is tensioned due to the load applied by the occupant at an emergency time, the outer belt supporting member slides while being rotated, overcoming a pushing force of the elastic member until the outer belt supporting member is locked by the locking member. Consequently, the outer belt is stopped from being shifted with respect to the seat belt connecting device.

DETAILED DESCRIPTION OF THE INVENTION

Hereinafter, the present invention will be explained according to embodiments with reference to the drawings.

Figure 1:
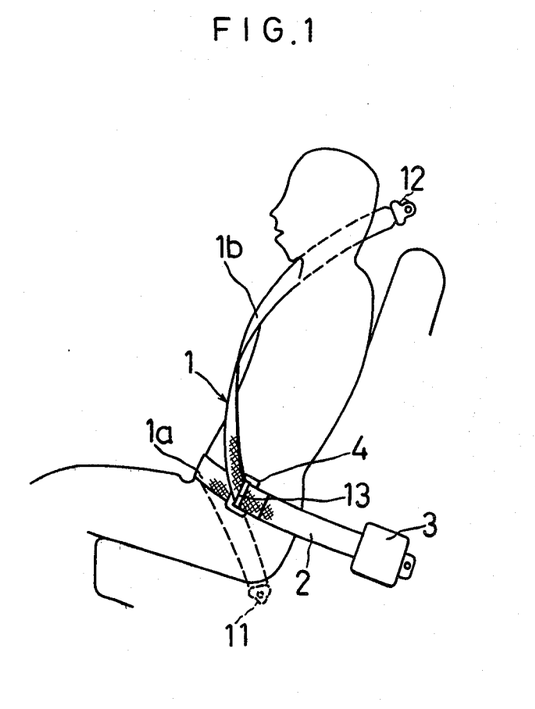
FIG. 1 is a schematic view showing one example of a seat belt system using a seat belt connecting device.

FIG. 1 shows one example of a seat belt system wherein a seat belt connecting device of the present invention is used.

The seat belt system shown in FIG. 1 is provided with an outer belt 1, an inner belt 2 and a retractor 3. The outer belt 1 is composed of a lap belt portion 1a and a shoulder belt portion 1b. One end 11 of the outer belt 1 on the side of the lap belt portion 1a is fixed to the lower end of a door (not shown) of a vehicle on the opposite side to a hinge thereof. And the other end 12 of the outer belt 1 is fixed to the upper portion of a frame of the door on the opposite side to a hinge thereof.

A retractor 3 is fixed to the floor within the vehicle. The inner belt 2 is withdrawn from the retractor 3. The retractor 3 is of well known type provided with a locking mechanism which prevents the inner seat belt 2 from being withdrawn therefrom at an emergency time such as upon an impact of the vehicle.

The seat belt connecting device 4 connects the outer belt 1 to the inner belt 2 and shiftably supports the middle portion 13 of the outer belt 1.

The seat belt connecting device 4 divides the outer belt 1 into the lap belt portion 1a and the shoulder belt portion 1b in the middle portion 13. The lap belt portion 1a extends over the lap of the occupant and the shoulder belt portion 1b extends over the upper half thereof from his shouler to his chest.

The seat belt connecting device 4 of the present invention usually supports the outer belt 1 so as to be shiftable with respect thereto. And at an emergency time such as upon an impact of the vehicle, the seat belt connecting device 4 operates to substantially prevent the outer belt 1 from being shifted with respect thereto.

FIG. 2 to FIG. 6 show a seat belt connecting device 4 of a first embodiment. The seat belt connecting device 4 comprises a main body 5, a roller 6 and an elastic member 7.

The main body 5 is composed of a pair of nearly rectangular metallic body plates 51 and 51' and a pair of covers 52 and 52' made of resin. The covers 52 and 52' have similar shape to the body plates 51 and 51' respectively. The opposed surfaces of the body plates 51 and 51' are joined by welding or the like.

The covers 52 and 52' joined to the body plates 51 and 51' respectively so as to cover them by means of an adhesive agent or the like.

Thus, the main body 5 is formed into a nearly rectangular shaped frame composed of an upper side portion 5a, a bottom side portion 5b and left and right side portions 5c and 5d.

Figure 6:
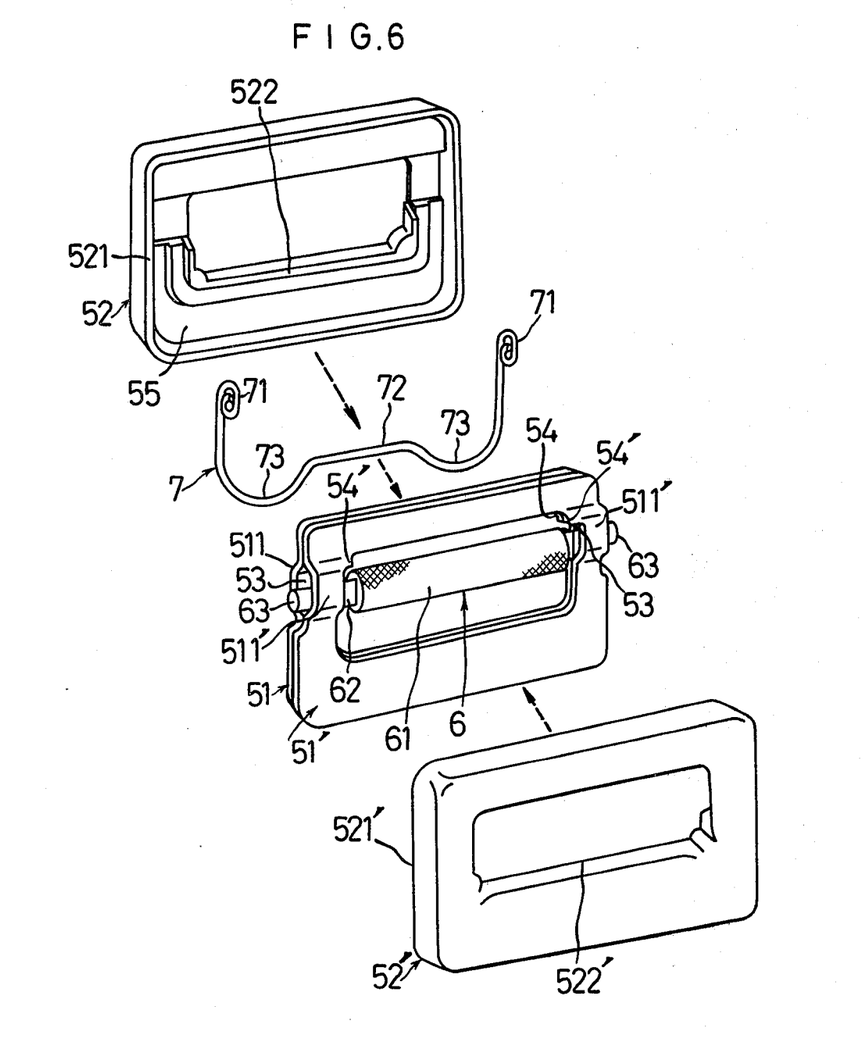
FIG. 6 is an exploded perspective view of a seat belt connecting device of the first embodiment.
Figure 7:
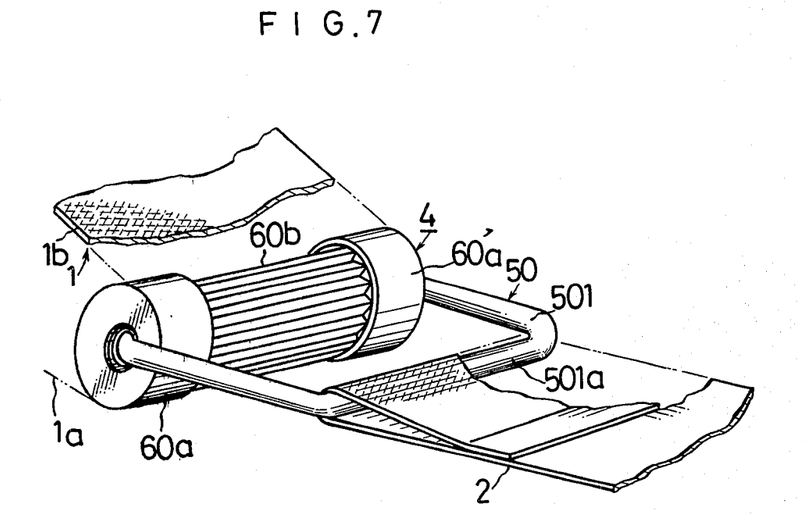
FIG. 7 is a perspective view showing a seat belt connecting device of a second embodiment.
Figure 8:
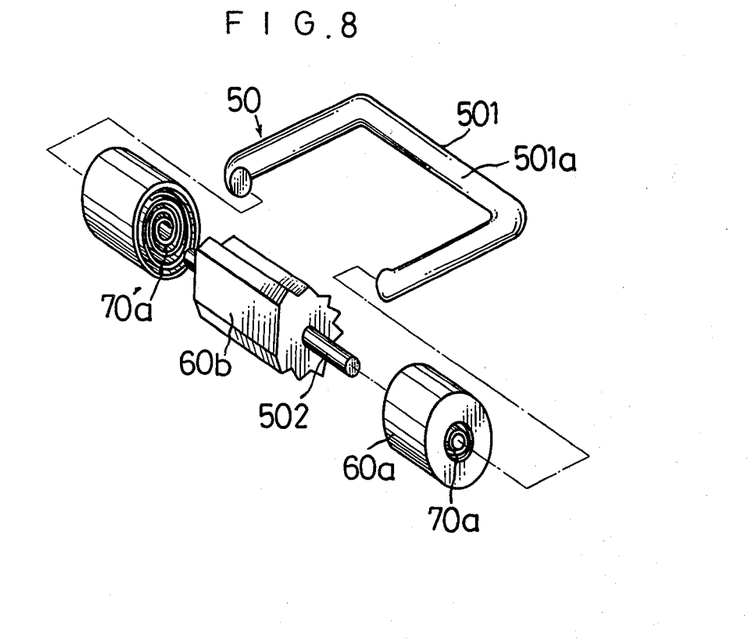
FIG. 8 is an exploded view of the second embodiment.

As shown in FIG. 6, in the left and right side portions of the body plates 51 and 51' which are joined to each other, long holes 53 are formed respectively so as to be opposed to each other. Each long hole 53 is defined by bent portions 511 and 511' which are formed in each of the left and right side portion of the body plates 51 and 51'. And in the upper side portions of the body plates 51 and 51', projecting portions 54 and 54' are formed so as to project inwardly from both ends thereof. The top end surfaces 541 and 541' of the projecting portions 54 and 54' are formed flat.

In the outer peripheries of the covers 52 and 52', peripheral walls 521 and 521' are formed respectively and in the inner peripheries of the bottom side portions of the covers 52 and 52', walls 522 and 522' are formed respectively.

The covers 52 and 52' cover outer surfaces of the body plates 51 and 51' and inner peripheries of the bottom side portions thereof. And from the bottom side portion to the left and right side portions of the inner surface of each cover 52 or 52', a groove 55 or 55' is formed so as to be opposed to each body plate.

Figure 2:
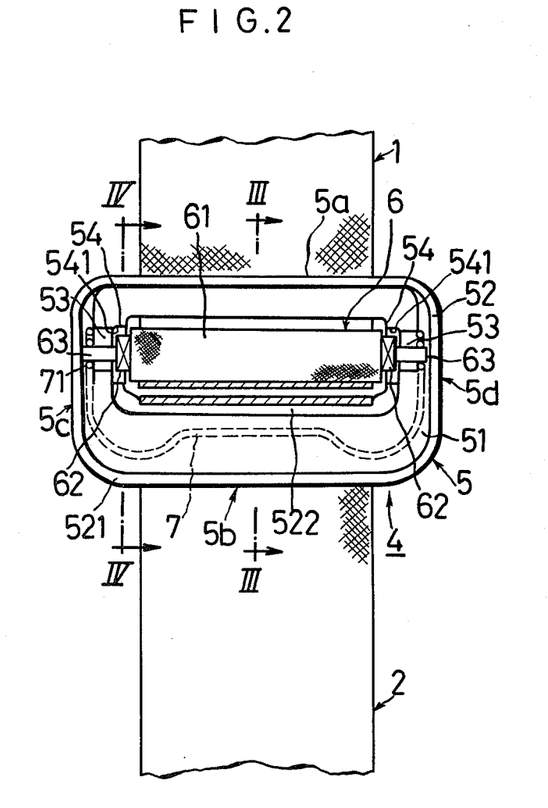
FIG. 2 is a front view of a seat belt connecting device of a first embodiment of the present invention, of which one portion is removed therefrom.

The inner belt 2 is fastened to the bottom side portion 5b of the main body 5.

The roller 6 is composed of a columnar belt supporting portion 61, square pillar portions 62 positioned on both sides of the belt supporting portion 61 and columnar shaft portions 63 which projects from the square pillar portion 62.

Both shaft portions 63 are inserted into the long holes 53 formed in the left and right side portions of the main body 5 respectively so that the roller 6 can be freely rotated and slided upwardly and downwardly along the long holes 53.

The belt supporting portion 61 is positioned inside the rectangular frame-shaped main body 5 and the square pillar portions 62 are opposed to the top end surfaces 541 and 541' of the projecting portions 54 and 54' respectively.

The outer surface of the belt supporting portion 61 is formed rough by knurling or the like. The outer belt 1 is extended around the belt supporting portion 61 and is supported thereby.

The elastic member 7 is composed of one spring which is bent like a letter U. This spring 7 is disposed within the groove 55 of the cover 52.

Engaging portions 71 are formed in both ends of the spring 7 to be engaged with both ends of the shaft portions 63 of the roller 6 respectively.

The spring 7 is composed of a straight portion 72 which is contacted with one side surface forming the groove 55 in the central portion thereof, and arc-shaped bent portions 73 which are contacted with the other side surface forming the groove 55 on both sides of the straight portion 72. The spring 7 is disposed within the groove 55 so as not to be moved therein.

The spring 7 pushes the roller 6 downwardly so that the shaft portions 63 thereof are positioned in the bottom portions of the long holes 53 of the main body 5.

When the shaft portions 63 are located at such a position as described above, the square pillar portions 62 of the roller 6 are not engaged with the projecting portions 54 and 54' of the main body 5 so that the roller 6 can be freely rotated.

Figure 5:
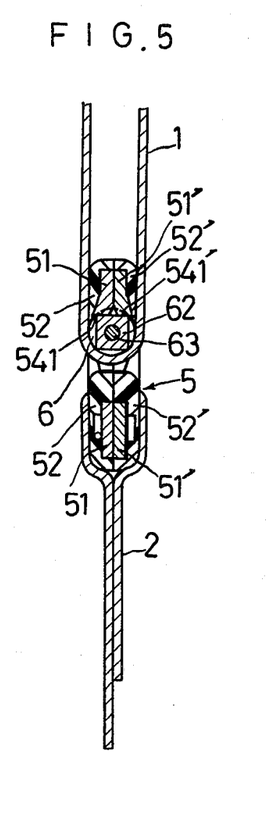
FIG. 5 is a sectional view of a seat belt connecting device of the first embodiment at an emergency time.

When tension force larger than a predetermined value is applied because the outer belt 1 and the inner belt 2 upon an impact of the vehicle, the roller 6 slides upwardly along the long holes 53, overcoming the pushing force of the spring 7 and then the square pillar portions 62 are engaged with the flat surfaces 541 and 541' formed in the projecting portions 54 and 54' of the main body 5.

In the seat belt system shown in FIG. 1, when the occupant opens the door of the vehicle, the outer belt 1 is pulled outwardly since the both ends 11 and 12 are fixed to the door on the opposite side to the hinge thereof.

Accordingly, the inner belt 2 is withdrawn from the retractor 3. And the outer belt 1 and the inner belt 2 are lifted forwardly so that the occupant can easily enter into the vehicle.

When the occupant closes the door after entering into the vehicle, the inner belt 2 is wound up by the retractor 3 so that the outer belt 1 extends over the occupant in a good condition.

Figure 3:
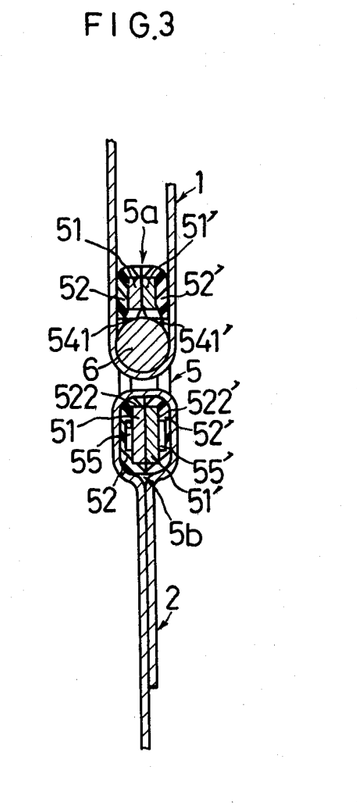
FIG. 3 and FIG. 4 are sectional views taken along the line of III—III or IV—IV of FIG. 2 respectively.
Figure 4:
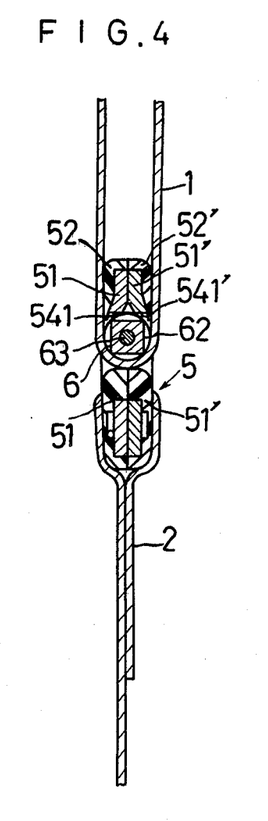

The roller 6 of the seat belt connecting device 4 of the present invention is ususally located at such a position as shown in FIG. 2 to FIG. 4 when the occupant wears the outer belt 1. The square pillar portions 62 of the roller 6 are not engaged with the projecting portions 54 and 54' of the main body 5 so that the roller 6 is freely rotated.

Due to the rotation of the roller 6, the outer belt 1 can smoothly shift from the side of the lap belt portion 1a to the side of the shoulder belt portion 1b.

As a result, the ratio of the length of the lap belt portion 1a to that of the shoulder belt portion 1b is changed according as the physique or motion of the occupant. Therefore, even when the occupant moves in order to operate switches and the like within the room of the vehicle, the outer belt 1 smoothly shifts with respect to the seat belt connecting device in accordance with the movement of the occupant.

Next, at an emergency time such as upon an impact of the vehicle, the inner belt 2 is locked so as not to be withdrawn from the retractor 3, and then excessively large load is applied to the outer belt 1 and the inner belt 2 due to the forward movement of the occupant.

At this time, the roller 6 of the seat belt connecting device 4 slides upwardly along the long holes 53 overcoming the pushing force of the spring 7 due to large tension force applied between the outer belt 1 and the inner belt 2. And the square pillar portions 62 of the roller 6 are engaged with the flat surfaces 541 and 541' formed in the projecting portions 54 and 54' of the main body 5 as shown in FIG. 5.

As a result, the roller 6 is prevented from being rotated.

The outer belt 1 which is supported by the roller 6 is substantially prevented from being shifted with respect to the roller 6 due to frictional force generated between the outer belt 1 and the surface of the roller 6.

By making the outer surface 611 of the belt supporting portion 61 rough, large friction force can be obtained so that the outer belt 1 is prevented from being shifted more surely.

In order to generate large friction force between the outer belt 1 and the belt supporting portion 61, the belt supporting portion 61 may be covered with rubber.

As described above, the outer belt 1 can be substantially prevented from being shifted by the seat belt connecting device. Therefore, the excessive increment of the amount of the forward movement of the upper half of the occupant's body and the generation of the submarine phenomenon are prevented. Consquently, the occupant can be protected with safety.

As described above, the seat belt connecting device 4 of the first embodiment shiftably supports the outer belt 1 at usual times and prevents the outer belt 1 from being shifted to protect the occupant with safety at an emergency time.

According to the first embodiment, the square pillar portions can be also provided on the outer periphery of the belt supporting member 61 by cutting one portion thereof to form a flat surface.

The elastic member can be made of various springs and elastic material such as rubber.

As described above, the seat belt connecting device of the first embodiment has excellent effect that the occupant can be surely protected at an emergency time and that the outer belt can be smoothly shifted at usual times.

FIG. 7 to FIG. 10 show a second embodiment of the present invention.

A frame 50 of a seat belt connecting device 4 is composed of a U-shaped first frame member 501 and a rod-shaped second frame member 502 which are welded to each other like a ring.

To one side 501a of the first frame member 501, one end of the inner belt 2 is fastened.

The seat belt connecting device 4 is further provided with a first outer belt supporting member composed of a pair of rollers 60a and 60'a, a second supporting member 60b and an elastic member composed of a pair of flat spiral springs 70a and 70'a.

The second outer belt supporting member 60b is formed into a columnar shape and in the surface along which the outer belt extends, a plurality of axially extending projections having a triangular section respectively are formed. The second outer belt supporting member 60b is attached to the middle portion of the second frame member 502 of the frame 50.

The flat spiral springs 70a and 70'a are rotatably mounted to both ends of the second frame member 502 respectively.

The rollers 60a and 60'a have a cylindrical shape of which size is equal to each other. The outer diameter of the rollers 60a and 60'a is larger than that of the second outer belt supporting member 60b. The rollers 60a and 60'a are rotatably mounted in both ends of the second frame member 502 through the flat spiral springs 70a and 70'a.

And the outer belt 1 is stretched around the rollers 60a and 60'a.

Other elastic body such as rubber can be used in place of the flat spiral spring as the elastic material.

Figure 9:
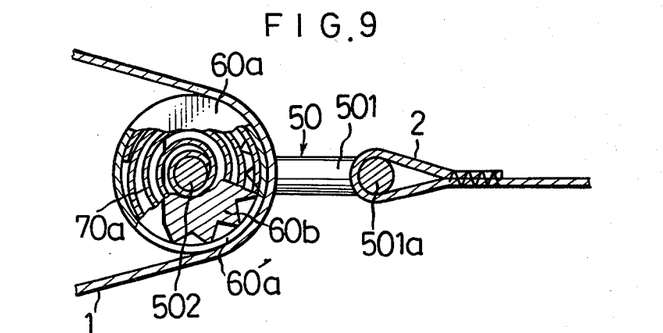
FIG. 9 is a partially sectional view of the second embodiment.

In the seat belt connecting device 4 of the second embodiment, the outer belt 1 which extends around the rollers 60a and 60'a is usually not contacted with the second outer belt supporting member 60b and freely shifted according as the motion of the occupant due to the rotation of the rollers 60a and 60'a.

Figure 10:
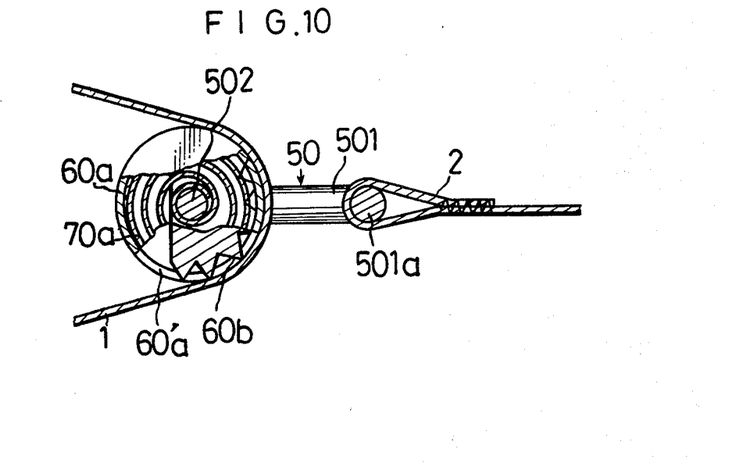
FIG. 10 is a partially sectional view of the second embodiment showing the condition at an emergency time.

Upon an impact of the vehicle, the seat belt is locked from being withdrawn from the retractor 3 and large tension force is applied between the inner belt 2 and the outer belt 1 due to the forward movement of the occupant.

Due to the large tension force, the flat spiral springs 70a and 70'a deform so that the rollers 60a and 60'a move in the tensioning direction of the outer belt 1 and that the outer belt 1 is contacted with the knurled surface of the second outer belt supporting member 60b and is pressed thereby.

Consequently, the relative shift of the outer belt 1 with respect to the connecting device 4 is substantially prevented.

Figure 11:
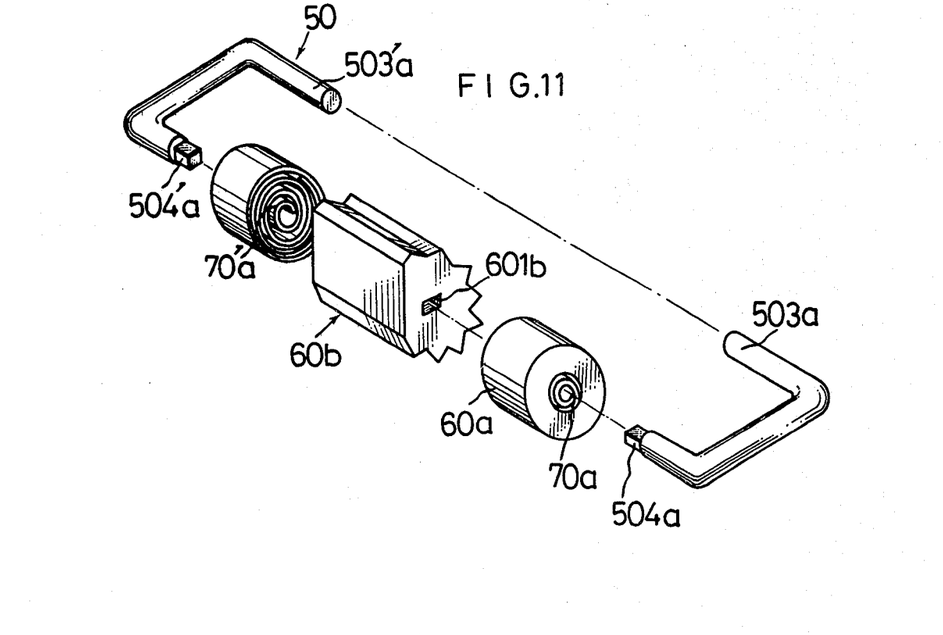
FIG. 11 is an exploded view of a seat belt connecting device of a third embodiment.

FIG. 11 shows a third embodiment of the present invention.

The frame 50 is composed of a pair of U-shaped frame members 503a and 503'a.

In each one end of the first frame member 503a and the second frame member 503'a, a key portion 504a and 504'a having a rectangular section are formed respectively to be fit in each hole 601b of a rectangular section which is formed in each end surface of the second outer belt supporting member 60b.

The other ends of the first frame member 503a and the second frame member 503'a are joined to each other by welding.

Other construction of the third embodiment is substantially equal to that of the second embodiment and the seat belt connecting device of the third embodiment has the same effect as that of the second embodiment.

Having now fully described the invention, it will be apparent to one of ordinary skill in the art that many changes and modifications can be made thereto without departing from the spirit or scope of the invention as set forth herein.

What is claimed is:

1. A seat belt connecting device for connecting an outer belt composed of a lap belt portion and a shoulder belt portion to an inner belt, comprising:
   a rectangular-shaped frame member, to one side of which one end of said inner belt is fastened;
   an outer belt supporting member which supports said outer belt between said lap belt portion and said shoulder belt portion;

both ends of said outer belt supporting member being rotatably and slidably supported by opposed sides of said frame member in parallel with said side to which said inner belt is fastened;

at least one portion of a surface of said outer belt supporting member being formed so as to generate friction resistance relative to said outer belt;

an elastic member which is provided between said frame member and said outer belt supporting member so as to push said outer belt supporting member in the direction opposite to the tensioning direction of said outer belt; and a locking member which is formed in said frame member for locking said outer belt supporting member to stop the rotation and the sliding movement of said outer belt supporting member when said outer belt supporting member slides, overcoming a pushing force of said elastic member, pulled by said outer belt at an emergency time.

2. A seat belt connecting device according to claim 1, wherein:

said outer belt supporting member is composed of a roller comprising a columnar outer belt supporting portion around which said outer belt extends, locking portions having a polygonal section respectively, which are formed adjacent to both ends of said outer belt supporting portion and a columnar shaft portions which project from said locking portions;

said opposed sides of said frame member is provided with long holes respectively, which extend along said opposed sides, and into which said shaft portions are rotatably and slidably inserted respectively; and said locking member projects from both ends of an opposed side of said frame member to said side to which said inner belt is fastened, so as to be engaged with said locking portions of said roller when said roller moves toward said opposed side of said frame member, pulled by said outer belt.

3. A seat belt connecting device according to claim 3, wherein:

at least one portion of the surface of said outer belt supporting portion of said roller is formed rough.

4. A seat belt connecting device according to claim 2, wherein:

said outer belt supporting portion of said roller is covered with rubber.

5. A seat belt connecting device according to claim 2, wherein:

said elastic member is composed of a spring which is disposed in said frame member and which presses said shaft portions of said roller against the bottom surfaces of said long holes.

6. A seat belt connecting device according to claim 1, wherein:

said outer belt supporting member is composed of a first supporting member which shiftably supports said outer belt and a second supporting member which operates as said locking member;

said first suppporting member is composed of a pair of cylindrical bodies and is rotatably mounted to both ends of an opposed side of said frame member to said side to which said inner belt is fastened, through said elastic member; and said second supporting member is shaped into a column of which outer diameter is smaller than that of said first supporting member and of which surface is formed rough, and is mounted to said opposed side between said pair of cylindrical bodies;

whereby when said first supporting member is pulled by said outer belt which extends around said first supporting member, said elastic member is deformed and then said first supporting member moves in the outer belt tensioning direction so that said second supporting member is contacted with said outer belt to lock said outer belt for preventing said seat belt from shifting with respect to said outer belt supporting member.

7. A seat belt connecting device according to claim 6, wherein:

said elastic member is composed of a pair of flat spiral springs which are rotatably mounted in both ends of said opposed side of said frame member within said pair of cyindrical bodies respectively.

8. A seat belt connecting device for connecting an outer belt composed of a lap belt portion and a shoulder belt portion to an inner belt, comprising:

a frame member to which one end of said inner belt is fastened;

a supporting member provided with a cylindrical surface for supporting said outer belt, which is rotatably supported by said frame member so as to be slidable relative to said frame member when a load larger than a predetermind value is applied to said outer belt;

a frictional force applying means, which applies frictional force to said outer belt at an emergency time;

said friction applying means applying said frictional force to said outer belt when said outer belt supported by said supporting member, moves together with said supporting member at an emergency time, so as to stop the movement of said outer belt relative to said frame member;

said frictional force applying means being composed of a fixed member provided with a rough surface, which is fixed to said frame member;

said supporting member being composed of a pair of flat spiral springs which are mounted in both ends of said fixed member and rollers along which said outer belt extends and which are rotatably supported by said frame member around said flat spiral springs, whereby at an emergency time, said flat spiral springs are deformed due to the load of said outer belt applied to said rollers to move said rollers and then said outer belt is pressed to said rough surface of said fixed member.

9. A seat belt connecting device for connecting an outer belt composed of a lap belt portion and a shoulder belt portion to an inner belt, comprising:

a frame member to which one end of said inner belt is fastened;

a supporting member provided with a cylindrical surface for supporting said outer belt, which is rotatably supported by said frame member so as to be slidable relative to said frame member when a load larger than a predetermined value is applied to said outer belt at an emergency time; and a friction applying means for applying a frictional force to said outer belt only when said supporting member slides relative to said frame member so as to stop the movement of said outer belt;

said friction applying means being composed of a fixed member provided with a rough surface, which is fixed to said frame member;

said supporting member being composed of a pair of rollers along which said outer belt extends and which are rotatably supported by said frame member and a pair of flat spiral springs each of which is accommodated within each of said rollers;

whereby at an emergency time, said flat spiral springs are deformed due to the load of said outer belt applied to said rollers to slide said rollers relative to said frame member and then said outer belt is pressed to said rough surface of said fixed member.

10. A seat belt supporting device for connecting an outer belt composed of a lap belt portion and a shoulder belt portion to an inner belt, comprising:

a frame member to which one end of said inner belt is fastened;

a supporting member provided with a cylindrical surface for supporting said outer belt, which is rotatably supported by said frame member so as to be slidable relative to said frame member when a load larger than a predetermined value is applied to said outer belt at an emergency time; and a friction applying means for applying a frictional force to said outer belt only when said supporting member slides relative to said frame member so as to stop the movement of said outer belt, said friction applying means being composed of a rough surface formed in said supporting member, an elastic member for biasing said supporting member so as to rotate at a usual time, and a locking member for locking said supporting member slided with respect to said frame member overcoming the force of said elastic member at an emergency time;

whereby at an emergency time, the load of said outer belt applied to said supporting member overcomes the force of said elastic member to slide said supporting member relative to said frame member, said locking member locks said supporting member and said outer belt is pressed to said rough surface of said supporting member.

* * * * *